(12) United States Patent
Gallucci

(10) Patent No.: US 12,424,845 B1
(45) Date of Patent: Sep. 23, 2025

(54) SYSTEMS AND METHODS FOR CREATING A WIRE COIL SHORT CIRCUIT REDUCER

(71) Applicant: Nicholas Anthony Gallucci, Los Angeles, CA (US)

(72) Inventor: Nicholas Anthony Gallucci, Los Angeles, CA (US)

( * ) Notice: Subject to any disclaimer, the term of this patent is extended or adjusted under 35 U.S.C. 154(b) by 0 days.

(21) Appl. No.: 18/892,202

(22) Filed: Sep. 20, 2024

(51) Int. Cl.
*H02H 9/02* (2006.01)

(52) U.S. Cl.
CPC .................................. *H02H 9/02* (2013.01)

(58) Field of Classification Search
CPC ........... H01H 47/22; H01F 1/147; H01F 6/06; H02H 9/02; H02H 9/021; H02H 9/023
USPC ...................................................... 361/93.9
See application file for complete search history.

(56) References Cited

U.S. PATENT DOCUMENTS

| | | | | |
|---|---|---|---|---|
| 5,153,804 A | * | 10/1992 | Pham ..................... | H02H 9/023 361/87 |
| 2007/0194870 A1 | * | 8/2007 | Takahashi ............ | H10N 60/355 335/216 |
| 2009/0072620 A1 | * | 3/2009 | Janik ........................ | H02J 4/00 307/11 |
| 2013/0314187 A1 | * | 11/2013 | Darmann ................ | H01F 38/00 336/170 |
| 2015/0357814 A1 | * | 12/2015 | Rozenshtein ............ | H01F 6/06 505/211 |
| 2021/0065957 A1 | * | 3/2021 | Fukuda ................... | H01F 27/08 |

FOREIGN PATENT DOCUMENTS

| | | |
|---|---|---|
| CN | 214152682 U | 9/2021 |
| KR | 102155455 B1 | 9/2020 |

OTHER PUBLICATIONS

Amini et al., "Design and Analysis of Fault Current Limiter Based on Air Core Variable Series Reactor", IEEE Power & Energy Society Section, Dec. 10, 2021, vol. 9, pp. 166129-166136, doi: 10.1109/access.2021.3134870.

Cvoric, "Novel Topology of Saturated-core Fault Current Limiter", Doctoral thesis, Delft University of Technology, Electrical Power Processing, Dec. 2010.

Moscrop et al., "Development and performance analysis of a saturated core high temperature superconducting fault current limiter", University of Wollongong, Faculty of Engineering and Information Sciences, Research Online, Jan. 1, 2009, 6 pages.

Prigmore et al., "Fault Current Limiting (FCL) Devices and Techniques", Switching Equipment, Springer, Jul. 17, 2018, Chapter 13, pp. 399-432.

Saini et al., "Design and characterisation of single-layer solenoid air-core inductors", IET Circuits, Devices & Systems, Feb. 18, 2019, vol. 13, No. 2, pp. 211-218, doi: 10.1049/iet-cds.2018.5082.

(Continued)

*Primary Examiner* — Danny Nguyen
(74) *Attorney, Agent, or Firm* — KPPB LLP

(57) ABSTRACT

Current reduction devices are described. Current reduction devices can be installed in an electrical circuit to reduce the available fault current at a device. When applied correctly, these current reduction devices not only enhance safety and protect equipment but also can ease the limitations, restrictions, and burdens imposed by compliance with regulatory standards enabling additional equipment options and increasing the possible application and installations in which the equipment can be utilized.

20 Claims, 14 Drawing Sheets

(56) References Cited

OTHER PUBLICATIONS

Yuan et al., "Saturated-core fault current limiters for AC power systems: Towards reliable, economical and better performance application", High Voltage, Oct. 31, 2019, vol. 5, No. 4, pp. 416-424, doi: 10.1049/hve.2019.0049.

* cited by examiner

Figure 2A

Prior Art

Figure 2B

Prior Art

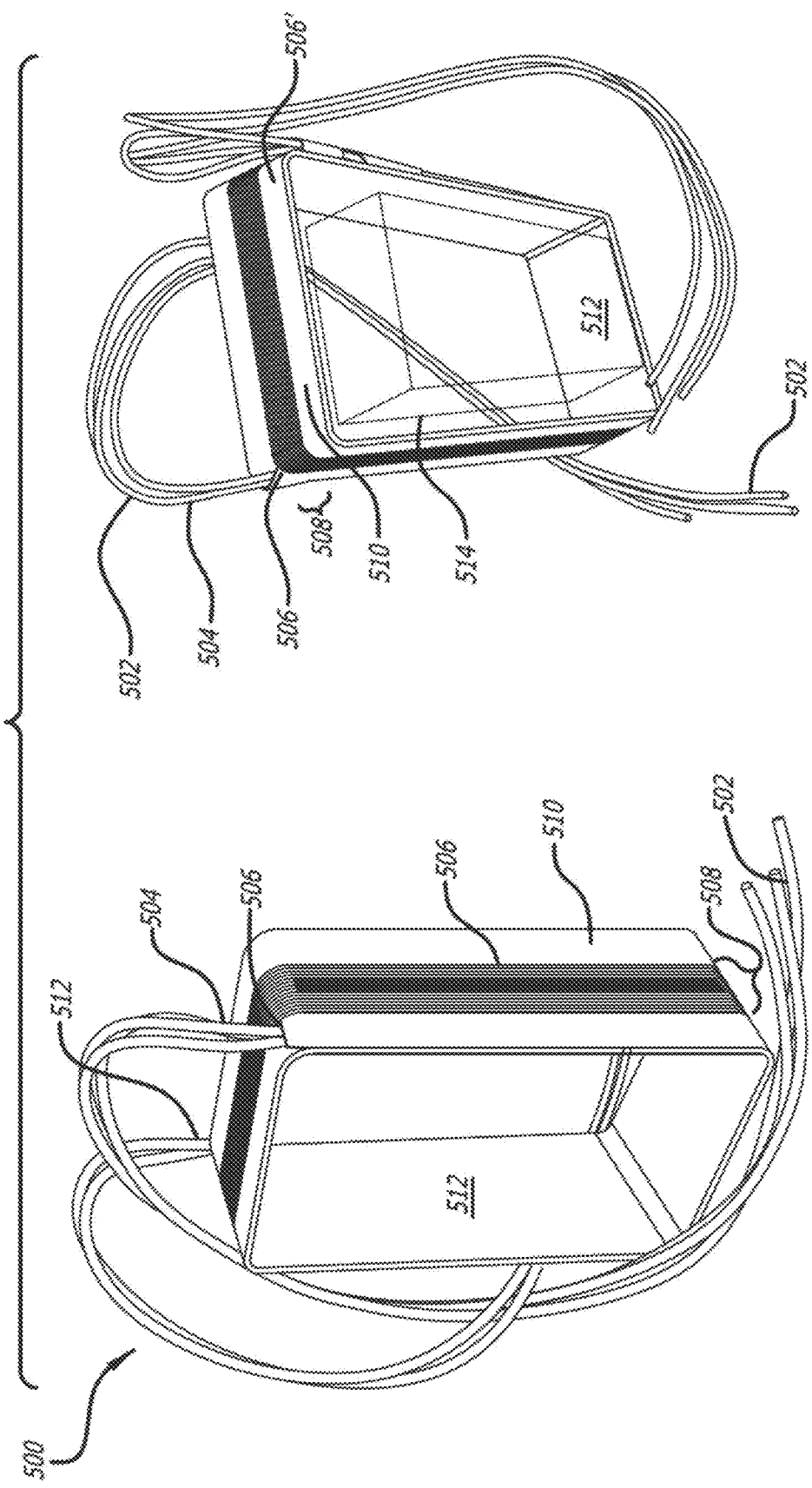

Figure 7A

| Applications | 480V 3P Applications | | |
|---|---|---|---|
| | Wire Coil Model | INPUT A.F.C. | OUTPUT A.F.C. |
| 30A 3P | 25' 3#10 | < 9,000 | 4,924 |
| 30A 3P | 50' 3#10 | < 60,000 | 4,986 |
| 30A 3P | 75' 3#10 | 125,000 | 3,523 |
| 100A 3P | 50' 3#1 | 21,000 | 13,820 |
| 100A 3P | 75' 3#1 | 29,000 | 13,968 |
| 100A 3P | 90' 3#1 | 35,000 | 13,680 |
| 225A 3P | 25' 3#4/0 | 44,200 | 34,958 |
| 225A 3P | 50' 3#4/0 | 60,000 | 34,930 |
| 225A 3P | 75' 3#4/0 | 90,000 | 34,418 |
| 400A 3P | 50' 3#600 | 48,000 | 34,856 |
| 400A 3P | 75' 3#600 | 50,500 | 34,976 |
| 400A 3P | 75' 3#600 | 275,000 | 64,848 |

Figure 7B

| Applications | 208V 3P Applications | | |
|---|---|---|---|
| | Wire Coil Model | INPUT A.F.C. | OUTPUT A.F.C. |
| 30A 3P | 25' 3#10 | 300,000 | 4,640 |
| 100A 3P | 50' 3#1 | 22,000 | 9,752 |
| 225A 3P | 55' 3#4/0 | 65,000 | 21,858 |
| 400A 3P | 25' 3#600 | 54,000 | 21,876 |

Figure 7C

| 480V 3P Applications | | | | 208V 3P Applications | | | |
|---|---|---|---|---|---|---|---|
| Wire Coil Model | INPUT A.F.C. | | OUTPUT A.F.C. | Wire Coil Model | INPUT A.F.C. | | OUTPUT A.F.C. |
| 25' 3#10 | 5500 | | 3653 | 25' 3#10 | 5500 | | 2536 |
| 25' 3#10 | 6000 | | 3867 | 25' 3#10 | 6000 | | 2639 |
| 25' 3#10 | 7000 | | 4250 | 25' 3#10 | 7000 | | 2816 |
| 25' 3#10 | 8000 | | 4606 | 25' 3#10 | 8000 | | 2964 |
| 25' 3#10 | 9000 | | 4924 | 25' 3#10 | 9000 | | 3093 |
| 25' 3#10 | 10000 | | 5222 | 25' 3#10 | 10000 | | 3203 |
| 50' 3#10 | 15000 | | 3951 | 25' 3#10 | 15000 | | 3686 |
| 50' 3#10 | 20000 | | 4275 | 25' 3#10 | 20000 | | 3814 |
| 50' 3#10 | 25000 | | 4466 | 25' 3#10 | 25000 | | 3965 |
| 50' 3#10 | 30000 | | 4603 | 25' 3#10 | 30000 | | 4078 |
| 50' 3#10 | 35000 | | 4706 | 25' 3#10 | 35000 | | 4153 |
| 50' 3#10 | 40000 | | 4797 | 25' 3#10 | 40000 | | 4216 |
| 50' 3#10 | 45000 | | 4853 | 25' 3#10 | 45000 | | 4266 |
| 50' 3#10 | 50000 | | 4904 | 25' 3#10 | 50000 | | 4307 |
| 50' 3#10 | 55000 | | 4944 | 25' 3#10 | 55000 | | 4341 |
| 50' 3#10 | 60000 | | 4986 | 25' 3#10 | 60000 | | 4369 |
| 75' 3#10 | 65000 | | 3433 | 25' 3#10 | 65000 | | 4394 |
| 75' 3#10 | 70000 | | 3446 | 25' 3#10 | 70000 | | 4415 |
| 75' 3#10 | 75000 | | 3458 | 25' 3#10 | 75000 | | 4434 |
| 75' 3#10 | 80000 | | 3468 | 25' 3#10 | 80000 | | 4450 |
| 75' 3#10 | 85000 | | 3477 | 25' 3#10 | 85000 | | 4465 |
| 75' 3#10 | 90000 | | 3485 | 25' 3#10 | 90000 | | 4478 |
| 75' 3#10 | 95000 | | 3492 | 25' 3#10 | 95000 | | 4490 |
| 75' 3#10 | 100000 | | 3498 | 25' 3#10 | 100000 | | 4500 |
| 75' 3#10 | 105000 | | 3504 | 25' 3#10 | 105000 | | 4510 |
| 75' 3#10 | 110000 | | 3509 | 25' 3#10 | 110000 | | 4519 |
| 75' 3#10 | 115000 | | 3514 | 25' 3#10 | 115000 | | 4527 |
| 75' 3#10 | 120000 | | 3519 | 25' 3#10 | 120000 | | 4534 |
| 75' 3#10 | 125000 | | 3523 | 25' 3#10 | 125000 | | 4541 |

Figure 8A

| SHORT CIRCUIT ANALYSIS @ 208V, 15' CABLE VS. 50' CABLE VS 100' CABLE |||||||||||
|---|---|---|---|---|---|---|---|---|---|---|
| SOURCE | FEED | VOLTAGE | PHASE | CIRCUIT AMPS | FEEDER SETS | CONDUIT TYPE | WIRE NO. | LENGTH IN FEET | START A.F.C. | END A.F.C. |
| 10KAIC PH1 | HVAC SCCR=5K | 208 | 1 | 20 | 1 | M | #12 | 15 | 1000 | 289 |
| 10KAIC PH1 | | 208 | 1 | 20 | 1 | M | #12 | 15 | 1000 | 346 |
| 22KAIC PH1 | | 208 | 1 | 20 | 1 | M | #12 | 15 | 2000 | 351 |
| 30KAIC PH1 | | 208 | 1 | 20 | 1 | M | #12 | 15 | 3000 | 374 |
| 42KAIC PH1 | | 208 | 1 | 20 | 1 | M | #12 | 15 | 4200 | 382 |
| 10KAIC PH1 | HVAC SCCR=5K | 208 | 1 | 20 | 1 | M | #12 | 50 | 1000 | 1107 |
| 10KAIC PH1 | | 208 | 1 | 20 | 1 | M | #12 | 50 | 1800 | 1198 |
| 22KAIC PH1 | | 208 | 1 | 20 | 1 | M | #12 | 50 | 2200 | 1213 |
| 30KAIC PH1 | | 208 | 1 | 20 | 1 | M | #12 | 50 | 3000 | 1231 |
| 42KAIC PH1 | | 208 | 1 | 20 | 1 | M | #12 | 50 | 4200 | 1245 |
| 10KAIC PH1 | HVAC SCCR=5K | 208 | 1 | 20 | 1 | M | #12 | 100 | 1000 | 600 |
| 10KAIC PH1 | | 208 | 1 | 20 | 1 | M | #12 | 100 | 1800 | 620 |
| 22KAIC PH1 | | 208 | 1 | 20 | 1 | M | #12 | 100 | 2200 | 623 |
| 30KAIC PH1 | | 208 | 1 | 20 | 1 | M | #12 | 100 | 3000 | 628 |
| 42KAIC PH1 | | 208 | 1 | 20 | 1 | M | #12 | 100 | 4200 | 632 |

Figure 8B

| SHORT CIRCUIT ANALYSIS @480V, 15' CABLE VS. 50' CABLE VS. 100' CABLE | | | | | | | | | | |
|---|---|---|---|---|---|---|---|---|---|---|
| SOURCE | FEED | VOLTAGE | PHASE | CKT/OCPD AMPS | FEEDER SETS | CONDUIT TYPE | WIRE NO. | LENGTH IN FEET | START A.F.C. | END A.F.C. |
| 14kAIC Ph | HVAC SCCR=5K | 480 | 3 | 20 | 1 | M | #12 | 15 | 14000 | 8283 |
| 18kAIC Ph | | 480 | 3 | 20 | 1 | M | #12 | 15 | 18000 | 8979 |
| 22kAIC Ph | | 480 | 3 | 20 | 1 | M | #12 | 15 | 22000 | 7509 |
| 30kAIC Ph | | 480 | 3 | 20 | 1 | M | #12 | 15 | 30000 | 8261 |
| 42kAIC Ph | | 480 | 3 | 20 | 1 | M | #12 | 15 | 42000 | 8966 |
| 14kAIC Ph | HVAC SCCR=5K | 480 | 3 | 20 | 1 | M | #12 | 50 | 14000 | 2748 |
| 18kAIC Ph | | 480 | 3 | 20 | 1 | M | #12 | 50 | 18000 | 2874 |
| 22kAIC Ph | | 480 | 3 | 20 | 1 | M | #12 | 50 | 22000 | 2960 |
| 30kAIC Ph | | 480 | 3 | 20 | 1 | M | #12 | 50 | 30000 | 3070 |
| 42kAIC Ph | | 480 | 3 | 20 | 1 | M | #12 | 50 | 42000 | 3162 |
| 14kAIC Ph | HVAC SCCR=5K | 480 | 3 | 20 | 1 | M | #12 | 100 | 14000 | 1524 |
| 18kAIC Ph | | 480 | 3 | 20 | 1 | M | #12 | 100 | 18000 | 1562 |
| 22kAIC Ph | | 480 | 3 | 20 | 1 | M | #12 | 100 | 22000 | 1587 |
| 30kAIC Ph | | 480 | 3 | 20 | 1 | M | #12 | 100 | 30000 | 1618 |
| 42kAIC Ph | | 480 | 3 | 20 | 1 | M | #12 | 100 | 42000 | 1649 |

Figure 8C

SHORT CIRCUIT ANALYSIS (INPUT)

| SOURCE | FEED | VOLTAGE | PHASE | CIRCUIT AMPS | FEEDER SETS | CONDUIT TYPE | WIRE NO. | LENGTH IN FEET | START A.F.C. | END A.F.C. |
|---|---|---|---|---|---|---|---|---|---|---|
| 14KAC PRI | CU SCCR=5K | 480 | 3 | 20 | 1 | X | #12 | 30 | 14000 | 4051 |
| 18KAC PRI | | 480 | 3 | 20 | 1 | X | #12 | 30 | 18000 | 4329 |
| 22KAC PRI | | 480 | 3 | 20 | 1 | X | #12 | 30 | 22000 | 4527 |
| 30KAC PRI | | 480 | 3 | 20 | 1 | X | #12 | 40 | 30000 | 3742 |
| 42KAC PRI | | 480 | 3 | 20 | 1 | X | #12 | 40 | 42000 | 3860 |
| 14KAC PRI | CU SCCR=5K | 480 | 3 | 40 | 1 | X | #8 | 70 | 14000 | 4260 |
| 18KAC PRI | | 480 | 3 | 40 | 1 | X | #8 | 70 | 18000 | 4592 |
| 22KAC PRI | | 480 | 3 | 40 | 1 | X | #8 | 80 | 22000 | 4932 |
| 30KAC PRI | | 480 | 3 | 40 | 1 | X | #8 | 80 | 30000 | 4134 |
| 42KAC PRI | | 480 | 3 | 40 | 1 | X | #8 | 90 | 42000 | 4303 |

SYSTEMS AND METHODS FOR CREATING A WIRE COIL SHORT CIRCUIT REDUCER

FIELD OF THE INVENTION

This application generally relates to current reduction devices. More specifically, it relates to devices that can be installed in an electrical circuit to reduce the available fault current at a device, as well as systems and methods for their creation and use.

BACKGROUND

Products designed to reduce fault currents exist today in various forms. A wide variety of products are available in the market today, specifically designed to mitigate fault currents in electrical systems. When applied correctly, these products not only enhance safety and protect equipment but also ensure compliance with regulatory standards.

These products utilize various mechanisms to limit or manage fault currents. For instance, fault current limiters, circuit breakers with adjustable trip settings, fuses, surge protectors, neutral grounding resistors, series reactors, arc fault circuit interrupters, ground fault circuit interrupters, dynamic voltage restorers, and static var compensators are commonly used for this purpose.

Each product is tailored to address specific applications and scenarios. The products employed often directly depend on the unique requirements of the electrical system. Factors such as the types of expected faults, the criticality of protecting specific equipment, and the system's overall safety and reliability goals play a significant role in selecting the most suitable product for implementation.

SUMMARY OF THE INVENTION

Devices and methods in accordance with some embodiments of the invention are directed to current reduction devices and methods for their manufacture and use.

Many embodiments of the disclosure are directed to a current reduction device comprising, a core, a plurality of terminals, an insulator, and a conductor; wherein the conductor forms a coil structure disposed about the core; wherein the core is configured with a set permeability; wherein each of the plurality of terminals, is electrically conductive, and is electrically coupled to the conductor; wherein the insulator is configured to isolate the conductor and is disposed on or about the conductor; wherein the conductor is configured with a set length, a cross-sectional geometry, a first end, and a second end; and wherein the first end and the second end are electrically coupled to separate terminals; wherein the coil structure is configured to reduce a set available fault current to below a set short circuit current.

In several embodiments, at least one of the plurality of terminals is configured as an input terminal configured to receive an electrical charge from an electrically coupled electrical source, and at least one of the plurality of terminals is configured as an output terminal configured to deliver the electrical charge to an electrically coupled device.

In some embodiments, the current reduction device is further configured to operate at or below 600V.

In various embodiments, the insulator comprises a material selected from the group consisting of enamel, epoxy, polymer, ceramic, glass, paper, and composite.

In numerous embodiments, the conductor is further configured to operate at or above 90° C.

In several embodiments, the set length is determined based on at least one electrical property selected from the group consisting of: impedance, resistance, and inductance.

In various embodiments, the set short circuit current is selected from the group consisting of: 5 kAIC, 10 kAIC, 14 kAIC, 18 kAIC, 22 kAIC, 25 kAIC, 35 kAIC, 42 kAIC, 65 kAIC, 100 kAIC, and 200 kAIC.

In several embodiments, the set short circuit current is below a set equipment rating of the electrically coupled device.

In several embodiments, the coil structure is configured for a set inductance configured to reduce phase shift.

In various embodiments, the electrical charge received from the electrical source is substantially identical to the electrical charge delivered to the electrical device.

In many embodiments, the cross-sectional geometry is configured for a set coil density.

In some embodiments, the set coil density is configured for a set inductance.

In various embodiments, the coil structure defines a volume defining the core.

In several embodiments, the core is further configured for a set magnetic flux.

In many embodiments, the set magnetic flux provides impedance matching.

In numerous embodiments, the coil structure comprises a plurality of winding directions configured for a set inductance.

In some embodiments, the coil structure is further configured to dissipate heat uniformly.

In several embodiments, the current reduction device further comprises an enclosure defining an interior volume, and the coil structure is disposed therein.

Numerous embodiments of the disclosure are directed to a system for current reduction, the system comprising, an electrical source, an electrical device with a set short circuit current rating, a current reduction device comprising a core, a plurality of terminals, an insulator, and a conductor; wherein the conductor forms a coil structure disposed about the core; wherein the core is configured with a set permeability; wherein each of the plurality of terminals, is electrically conductive, and is electrically coupled to conductor; wherein the insulator is configured to isolate the conductor and is disposed on or about the conductor; and wherein the conductor is configured with a set length, a cross-sectional geometry, a first end, and a second end; and wherein the first end and the second end are electrically coupled to separate terminals; wherein at least one of the plurality of terminals is configured as an input terminal and electrically coupled to the electrical source, and at least one of the plurality of terminals is configured as an output terminal electrically coupled to the electrical device; and wherein when a fault occurs the current reduction device is configured to reduce a set available fault current to below the set short circuit current rating.

Various embodiments of the disclosure are directed to a current reduction device comprising, a core, a plurality of terminals, an insulator, and a plurality of conductors; wherein the plurality of conductors form a coil structure disposed about the core; wherein the core is configured with a set permeability; wherein each of the plurality of conductors is configured with a set length, a cross-sectional geometry, a first end, and a second end; wherein the first end and the second end are electrically coupled to separate terminals; wherein the cross-sectional geometry is configured for a set coil density; wherein the insulator is disposed on or about the plurality of conductors and is configured to isolate the plurality of conductors; wherein the set permeability, the set length, and the set coil density are configured for a set impedance and to reduce phase shift; and wherein the coil structure is configured to reduce a set available fault current to below a set short circuit current.

Additional embodiments and features are set forth in part in the description that follows and, in part, will become apparent to those skilled in the art upon examination of the specification or may be learned by the practice of the disclosure. A further understanding of the nature and advantages of the present disclosure may be realized by reference to the remaining portions of the specification and the drawings, which form a part of this disclosure.

BRIEF DESCRIPTION OF THE DRAWINGS

The description will be more fully understood with reference to the following figures, which are presented as embodiments of the invention and should not be construed as a complete recitation of the scope of the invention, wherein:

FIGS. 2A and 2B depict NEC Table 310-16 in accordance with aspects of the prior art.

FIGS. 5A and 5B depict exemplary wire coil short circuit reducers in accordance with some embodiments.

FIGS. 7A through 7C depict example data for various embodiments.

FIGS. 8A through 8C depict example data and short circuit analysis for various embodiments.

DETAILED DESCRIPTION OF THE INVENTION

Figure 1:
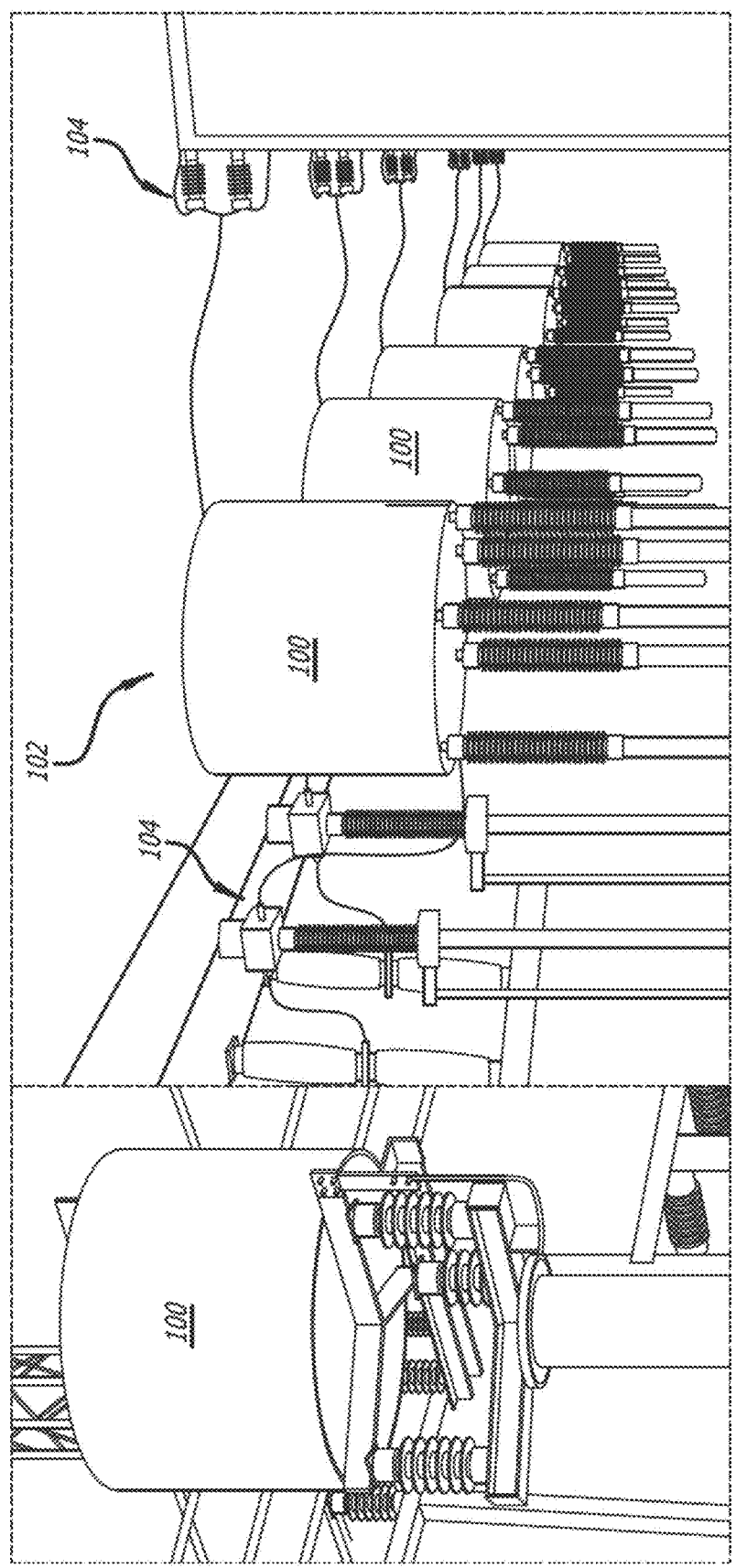
FIG. 1 illustrates current limiting reactors installed in a power system to control short-circuit currents in accordance with aspects of the prior art.

It will be understood that the components of the embodiments, as generally described herein and illustrated in the appended figures, may be arranged and designed in a variety of different configurations. Thus, the following more detailed description of various embodiments, as represented in the figures, is not intended to limit the scope of the present disclosure but is merely representative of various embodiments. While various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages and similar language throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may but do not necessarily, all refer to the same embodiment.

In many jurisdictions, the use of fault reduction products is mandated by controlling regulations. Products that reduce fault current help to minimize risks and hazards by limiting the amount of current that can flow during a fault. Fault current-reducing products most often restrict the ability of high current to rush past or through them. In other words, they limit the amount of current that can pass during a short, fault, or during problems and issues that can arise during non-normal usage. By reducing fault current, these products prevent damage to electrical components and systems, extending their lifespan and reducing maintenance costs.

FIG. 1 illustrates a prior art Current Limiting Reactors (CLRs) 100. A CLR 100 can be utilized in power systems 102 to control short-circuit currents. CLRS 100 control short-circuit currents by introducing a reactive-based impedance to increase the voltage drop across its terminals 104 during a fault. When employed, CLRs 100 can offer a cost-effective solution for managing high fault currents, for example, when a CLR 100 is deployed to divide busbars at a high-voltage substation 102 in a transmission system. If network expansion results in an increase in short-circuit currents that could exceed the equipment rating of the system components, sets of CLRs 100 can be installed to effectively reduce the short-circuit level to a lower amount that does not exceed the equipment rating eliminating the need to replace multiple circuit breakers and associated equipment with new equipment having higher short-circuit ratings, offering a prudent, cost-effective solution.

Additionally, regulatory standards often require electrical systems to have measures in place to manage fault currents. Using products designed for this purpose helps ensure that systems meet these standards, avoiding potential regulatory and financial penalties. The National Electrical Code (NEC), also known as NFPA 70, is a set of standards for the safe installation of electrical wiring and equipment in the United States. It is part of the National Fire Codes series published by the National Fire Protection Association (NFPA). The NEC provides guidelines to ensure electrical installations are safe and reliable, reducing the risk of electrical fires, shocks, and other hazards. While the NEC itself is not a law, it is widely adopted by states and local jurisdictions, making its compliance mandatory in many areas. The code is updated every three years to incorporate the latest safety practices and technological advancements. By following the NEC, electricians and contractors can ensure their work meets the highest safety standards, protecting both people and property.

The updated code mandates safety verification for all equipment. Previous versions of the National Electrical Code (NEC) exempted devices supplied by electrical sources under 60 A from needing a Short Circuit Current Rating (SSCR) equal to the available fault current (AFC). However, this exemption was eliminated, meaning such devices must now have an SSCR that matches or exceeds the AFC to ensure safety and compliance. The safety rating of equipment falling below the building fault rating results in non-compliance. For example, devices requiring electrical connections can have SSCR lower than the AFC, violating electrical codes and posing safety risks. Rectifying code violations often requires the utilization of costly system upgrades to products with the appropriate safety ratings to achieve the requisite SSCR. Thus, there is a need for readily available "off-the-shelf" products to address this issue.

Figure 2A:
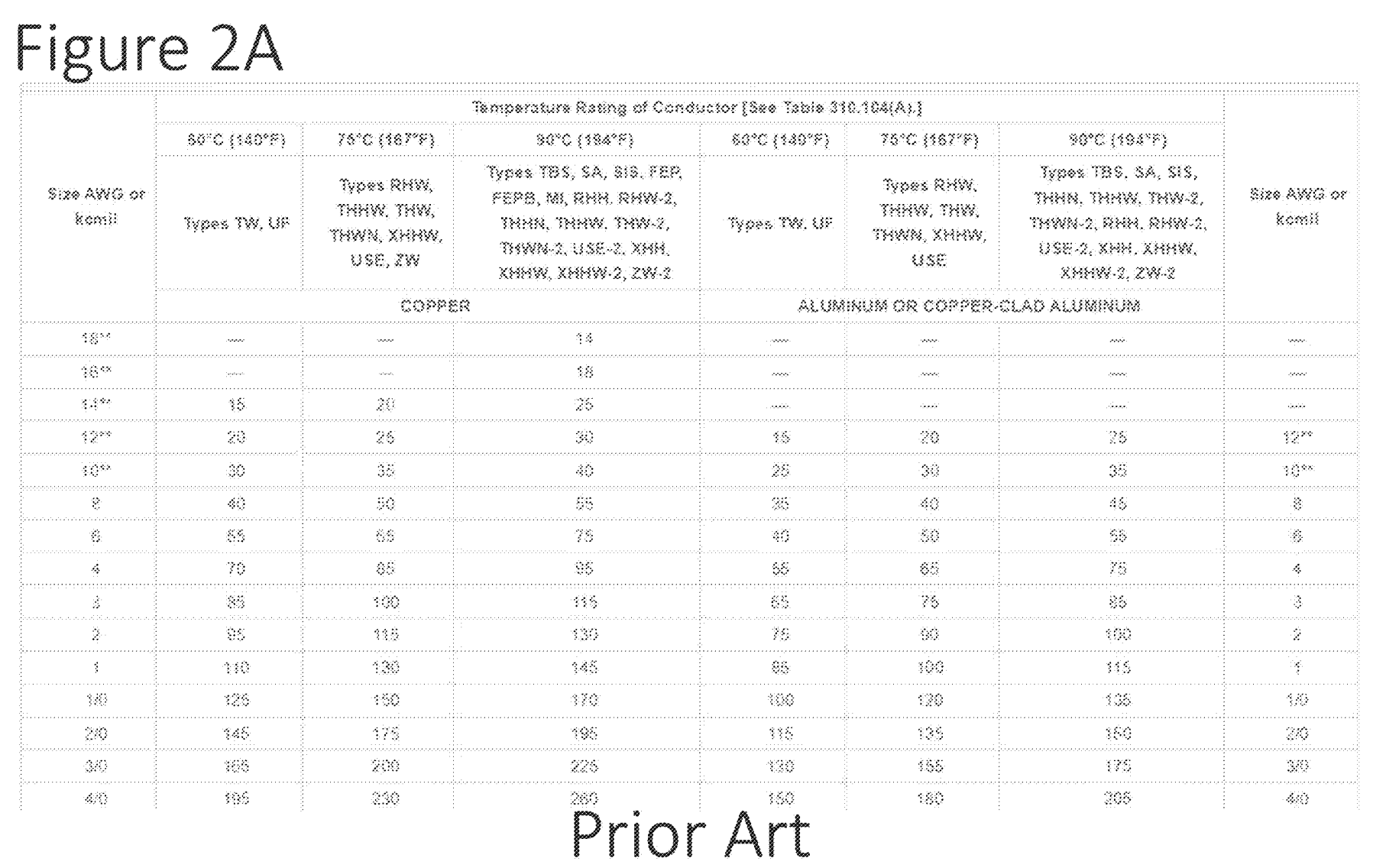
Figure 2B:
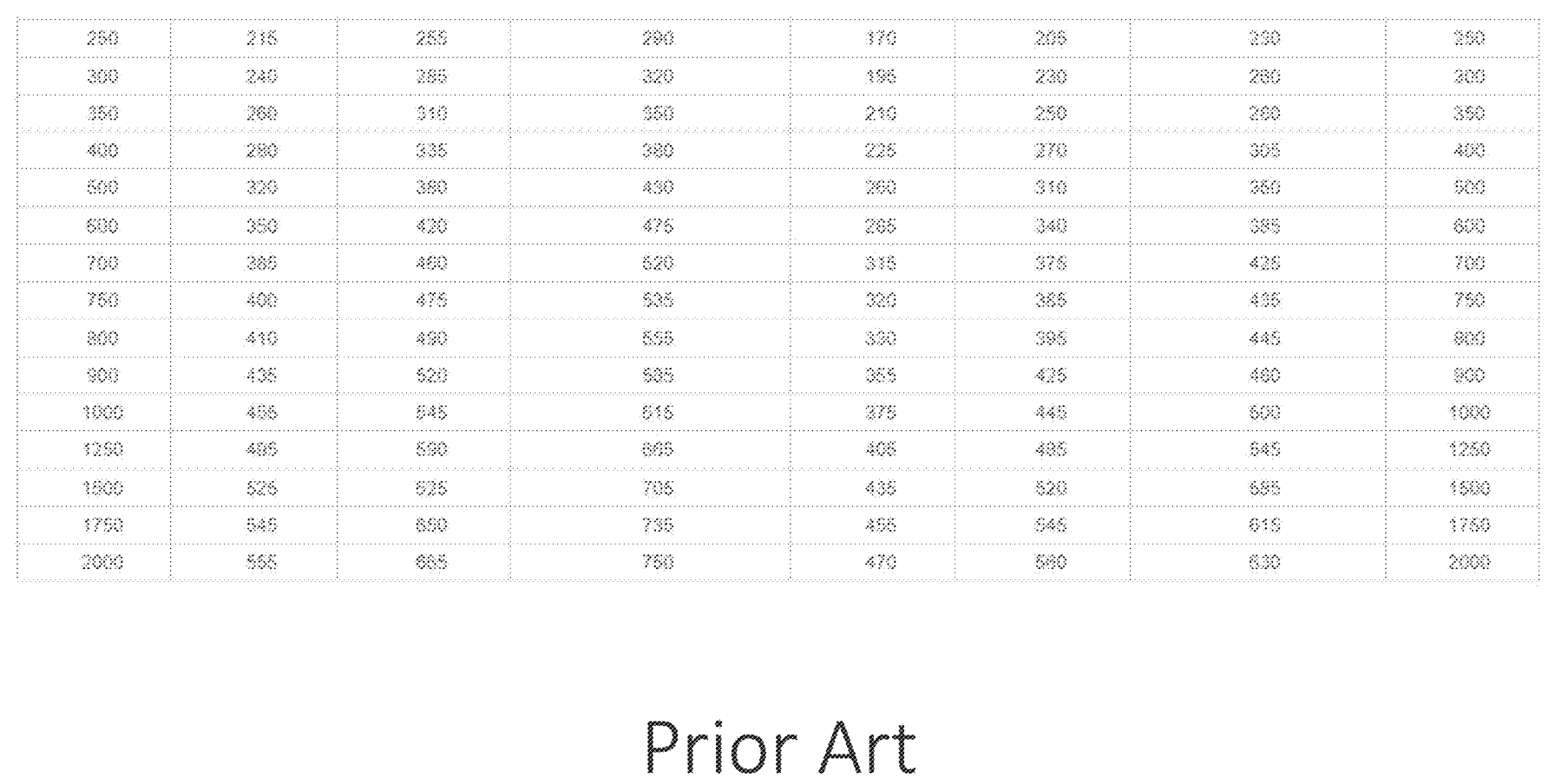

NEC Table 310-16, Illustrated in FIG. 2A and FIG. 2B, provides the allowable ampacities, or current-carrying capacities, for insulated conductors rated from 0 to 2000 volts. This table is essential for ensuring electrical systems are designed safely and efficiently. It lists the maximum current (in amperes) that different sizes of conductors can safely carry at various temperature ratings, such as 60° C., 75° C., and 90° C. The table includes a range of conductor sizes, typically measured in American Wire Gauge (AWG) or circular mils, and provides ampacity values for conductors at different temperature ratings, which are crucial for determining the appropriate conductor size based on the operating environment. Table 310-16 defines the allowable ampacities for insulated conductors with up to three current-carrying conductors in raceway, cable, or earth.

Electrical engineers and contractors use this table to select the appropriate conductor size for specific applications, ensuring that the conductors can handle the expected current without overheating. By adhering to the ampacity ratings in the table, installations comply with safety standards, reducing the risk of electrical fires and equipment damage. The table also helps in choosing conductors based on the ambient temperature and the insulation type, ensuring that the conductors operate within safe temperature limits. In many applications, to balance cost and safety, conductors that are smaller than or equal to #1 typically require utilizing the 60° C. ampacity ratings, while conductors larger than #1 often utilize the 75° C. ampacity ratings while utilizing the 90° C. ampacity ratings from Table 310-16 is generally impractical. The 90° C. ampacity ratings can often prompt installation and safety concerns that invoke additional scrutiny from inspectors and increase the installation's complexity, which frequently deters engineers and electrical contractors from utilizing the 90° C. ampacity rating despite the 90° C. column offering greater flexibility by providing higher ampacity values compared to the 60° C. and 75° C. columns, carrying more current without overheating. Despite these advantages, contractors often avoid using the 90° C. column. Most electrical equipment, such as circuit breakers, panels, and terminals, are rated for a maximum of 75° C. Additionally, inspectors may be hesitant to approve installations using the 90° C. column due to concerns about compatibility and safety. While the 90° C. column offers higher ampacities, the practical challenges and additional requirements often lead contractors to prefer the 75° C. or 60° C. columns for most applications.

A UL listing refers to a certification provided by Underwriters Laboratories (UL), an independent organization that tests and certifies products for safety. When a product is UL-listed, it has undergone rigorous testing to ensure it meets specific safety standards. These standards are designed to be acceptable to code enforcement authorities, such as inspectors. UL listings are important because they assure contractors, consumers and regulatory bodies that the product is safe to use for its intended purpose. The UL certification covers various safety aspects, including electrical safety, fire safety, and mechanical safety. Additionally, many local and state building codes require certain electrical products to be UL-listed and installed in homes and commercial buildings. UL-listed products provide consumers, contractors, and inspectors reassurance, knowing that the products have been tested for potential safety hazards and found to be reliable and safe.

A device that is assembled, tested, and UL-listed with a nameplate rating could overcome many of the perceived shortcomings of utilizing the 90° C. NEC ratings and enable more adoption and utilization of the 90° C. NEC ratings. A tested and listed device that takes advantage of higher temperature ampacity ratings would have greater flexibility in installation and provide numerous additional advantages, such as allowing for a shorter amount of wire and materials. By controlling the wire type and using 90° C. cable ratings, a device can utilize smaller, more affordable cables. This allows for two-wire size reductions and significantly shorter cable lengths to achieve the same result in many applications. Such a device in many applications results in a reduction in the amount of wire used, an increased temperature rating, and lower costs. Notably, while the examples described above use the NEC table and 90° C. rating as an example, higher temperature cables, and special cable geometries can be utilized for further improvement.

Embodiments

Figure 3:
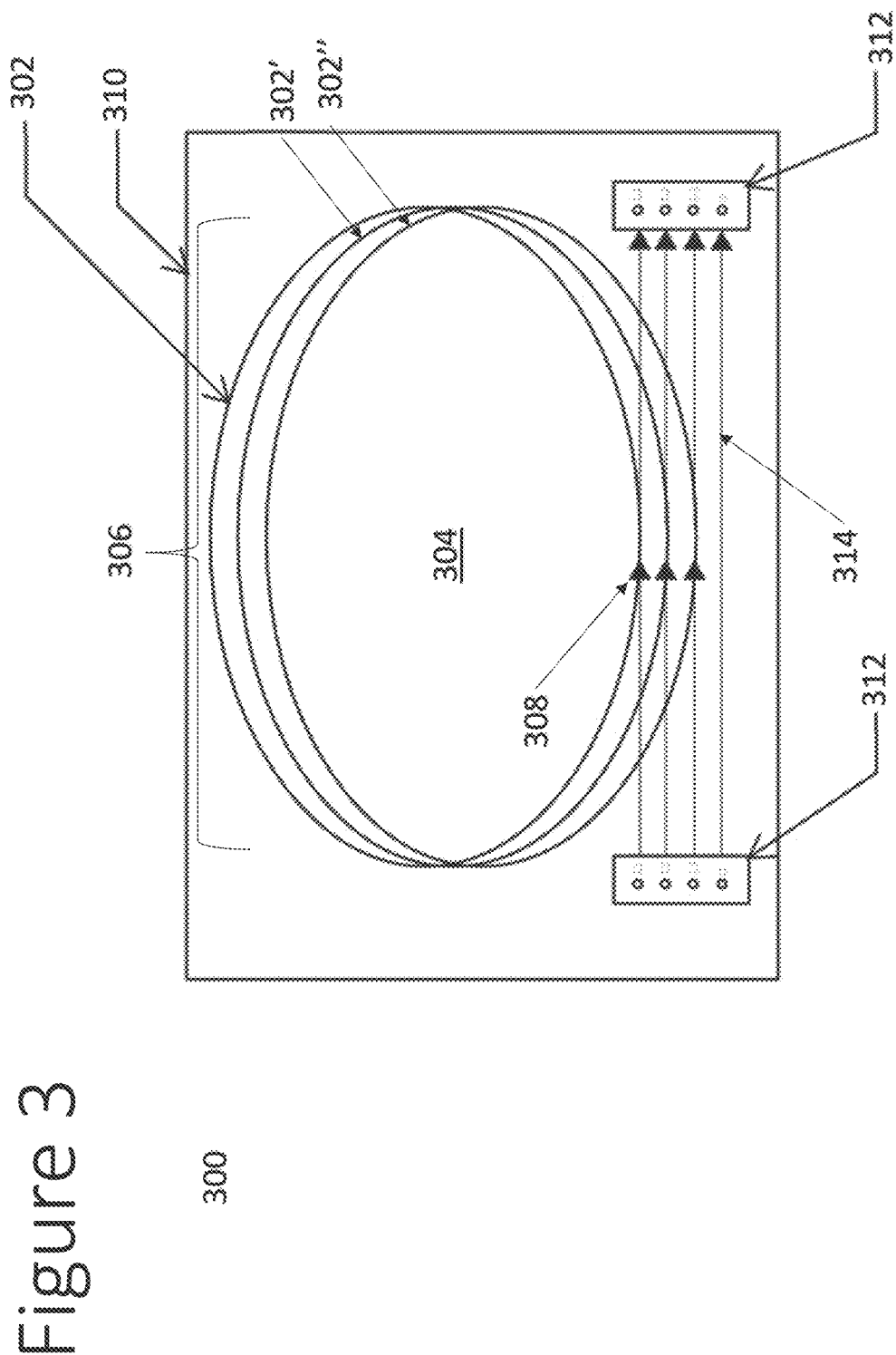
FIG. 3 depicts a schematic of a wire coil short circuit reducer in accordance with some embodiments.

FIG. 3 illustrates a wire coil short circuit reducer 300 in accordance with some embodiments. In some embodiments a wire coil short circuit reducer 300 can be installed in series with an electrical circuit to reduce the available short circuit at an electrical device. In many embodiments, a wire coil short circuit reducer device 300 can add a designed amount of impedance to a circuit to reduce the available fault current. In many such embodiments, this restricts the ability for a high current rush to pass through electrical circuits and limits the amount of current that can pass through it during a short, fault, or non-normal use.

In many embodiments, the wire coil short circuit reducer 300 utilizes resistance, inductance, and impedance to reduce fault current. Electrical wire 302 and conductors have an inherent resistance. The inherent resistance of a wire 302 increases with its length. The longer the length of the wire 302, the higher the resistance of the wire 302. The resistance of a length of wire 302 opposes the flow of current through the wire. During a fault condition, the fault current needs to travel the length of the wire 302 and overcome the resistance of the wire length 302, which results in a reduction in the amount of current that can flow during the fault. In addition to resistance, longer wire lengths also have increased inductance. Inductance is the property of the electrical conductor by which a change in current in the conductor induces a voltage (electromotive force) in both the conductor itself (self-inductance) and in any nearby conductors (mutual inductance). An induced voltage resists changes in current, which, during a fault, limits the rate of rise and the peak value of the fault current.

The total impedance of an electrical circuit is a combination of its resistance (R) and reactance (X). The reactance (X) includes inductive reactance (due to inductance) and capacitive reactance (due to capacitance). The impedance (Z) limits the maximum amount of current that can flow through a circuit for a given voltage. In many embodiments, as the length of the wire 302 feeder increases, so does its impedance (Z), which in many such embodiments can reduce the available fault current at a subsequent connected device. The fault current (If) available at the end of a feeder wire can be calculated with the formula If=V/Z where V is the source voltage, and Z is the total impedance of the feeder wire. As Z increases with longer feeder wire lengths, the fault current (if) decreases. In many embodiments, reducing the available fault current is a critical consideration for the electrical design and safety of an application or installation. In many such installations, reducing the available fault current can often influence the selection of protective devices and the equipment ratings employed, as the selected devices need to clear faults while minimizing damage and risk of injury adequately.

In many embodiments, the wire coil short circuit reducer 300 utilizes a single winding or coil 302. In other embodiments, the wire coil short circuit reducer 300 utilizes a plurality of windings or coils 302, 302', 302". In some embodiments, the winding wraps around a core 304, forming a coil structure 306. In some such embodiments, a first portion of the coil is wound in a first direction 308. In many embodiments, a second portion of the coil is wound in a second direction. For example, in some embodiments, the coil is wound half-clockwise around the core 304 and half-counterclockwise around the core. In many embodiments, the winding direction reduces inductance without reducing resistance.

Figure 4:
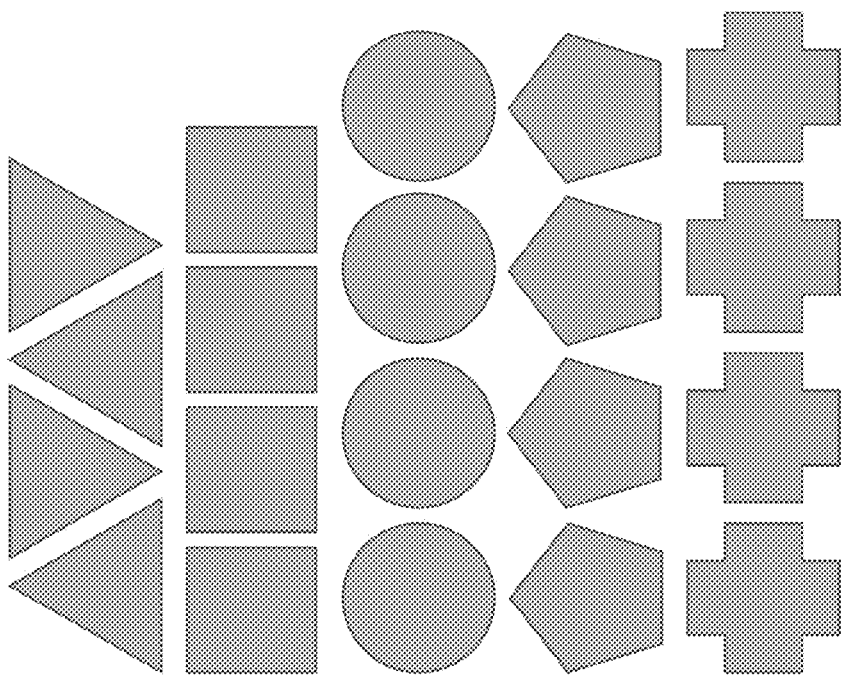
FIG. 4 illustrates various wire cross-section geometries and packing arrangements, in accordance with some embodiments.
Figure 4:
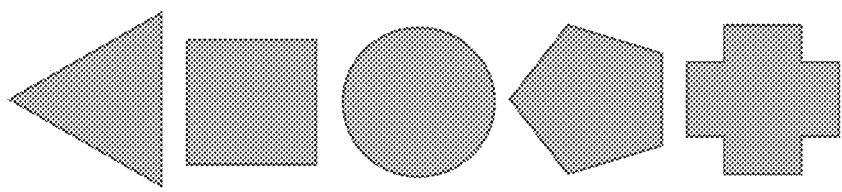

In some embodiments, the coil structure 306 comprises wire 302 with a set cross-section geometry. In many embodiments, the cross-section geometry is selected for winding efficiency. In some embodiments, the cross-section geometry is selected for winding density. In numerous embodiments, the cross-section geometry is selected for winding heat dissipation. For example, in some embodiments, triangle, or square cross-section geometry is selected for close packing and winding efficiency. In many embodiments, the cross-section geometry is configured so that the wire 302 wrap in the coil structure 306 is congruent with an adjacent coil wrap or coil 302, 302', 302". In other embodiments, the cross-section geometry is configured so that the wire 302 wrap in the coil structure 306 is incongruent with an adjacent coil wrap or coil 302, 302', 302". Various exemplary wire cross-section geometries and packing arrangements are illustrated in FIG. 4. In many embodiments, the wire 302 is isolated from adjacent structures and wires with an insulator (not shown). In many such embodiments the insulator is disposed on or about the wire 302. In numerous embodiments, the insolation consists of an enamel, epoxy, polymer, ceramic, glass, paper, and/or composite.

In many embodiments, the wire coil short circuit reducer 300 utilizes a core 304 with low permeability. In many embodiments, the coil structure 306 defines a volume that defines the core. In some embodiments, the wire coil short circuit reducer 300 utilizes an "air core" to achieve low permeability. In many such embodiments, the "air core" comprises a coil 306 without a solid core 304. In some embodiments, the coil structure is self-supporting. In other such embodiments, the coil 306 is wrapped around a support structure (not shown), defining a volume therewithin. In many such embodiments, the defined volume is open to the environment. In some such embodiments, the environment is an air-filled environment, and the air fills the volume for the "air core." In other such embodiment, the volume can be filled with other low permeable materials, or gasses. In some embodiments, the support structure can fully enclose the volume. In some such embodiments, the volume can confine materials, liquids, gases, or vacuum to form the core 304. In some embodiments, the coil structure is disposed within an enclosure 310. In some embodiments, the enclosure 310 supports the coil structure 306. In many embodiments, the enclosure is filled with materials or can contain a vacuum. In some such embodiments, the enclosure fills material, and the core comprises the same materials. In other embodiments, the core and enclosure volume are comprised of dissimilar materials. In many embodiments, the core 304 or "air core" material is selected to prevent the wire coil short circuit reducer 300 from functioning as an inductor.

In many embodiments, the coil structure 306 is coupled to and in electrical communication with terminals 312. In other embodiments, the coil structure 306 is electrically coupled with splices, lugs, plugs, sockets, or other electrical coupling devices and methods that would be known to someone skill in the art. In some embodiments, the terminals 312 are disposed on the enclosure 310. In some such embodiments, the terminals 312 pass through the enclosure such that the coil structure 306 is fully enclosed within the enclosure 310. In many embodiments, a grounding wire 314 is coupled to and in electrical communication with the terminals 312. In many embodiments, to achieve a reduction in fault current, the wire coil short circuit reducer 300 can use 90° C. (or higher) rated wire 302 for coil structure 306 and 90° C. rated terminals and lugs 312. In many embodiments, feeder wire (not shown) can be connected to higher-rated terminals and lugs 312. In many such embodiments, the feeder wire can be sized per NEC based on lower ampacities (75° C. or 60° C.), with no issues arising from a mismatch with higher rated terminals 312 and coil structure 306 wire 302.

Figure 5B:
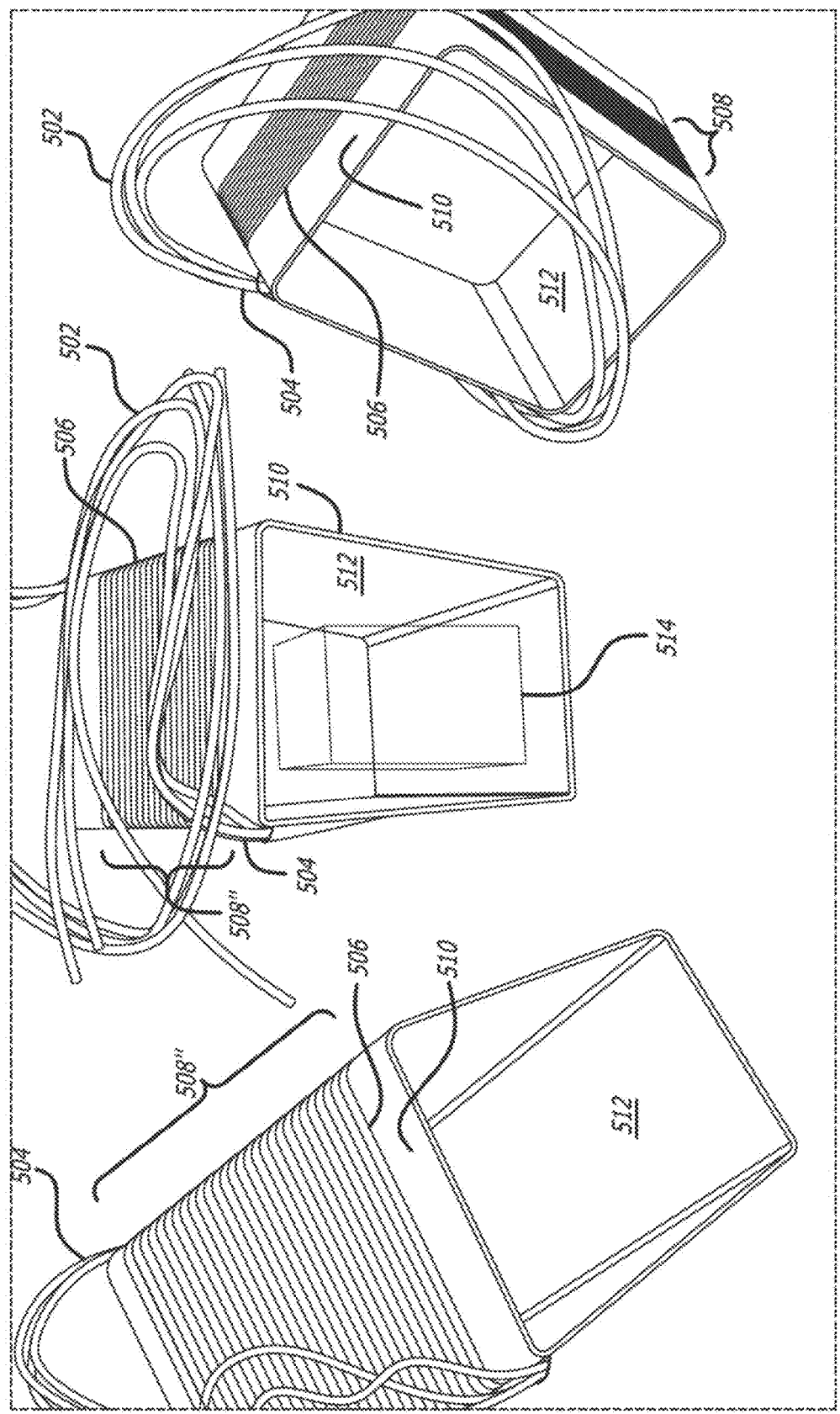

In many embodiments, the wire coil short circuit reducer 500 is installed in series with a circuit and effectively reduces the available fault current (AFC) to a level below the SSCR of the connected device. This ensures compliance with electrical code requirements and enhances safety. FIGS. 5A and 5B depict exemplary wire coil short circuit reducers 500 in accordance with some embodiments. In many such embodiments, the wire coil short circuit reducer 500 is utilized to reduce the available short circuit at a connected device (not shown) in an electrical circuit. In many embodiments, feeder wire 502 electrically couples the electrical device to the wire coil short circuit reducer 500. In many embodiments, the feeder wire 502 electrically couples to the wire coil short circuit reducer 500 at a coupling point 504 terminal, lug, or wire splice. The coupling point 504 is electrically coupled to at least one wire 506 or the wire coil short circuit reducer 500, which forms a coil structure 508. The wire is often coated in an insulator to isolate it from adjacent elements. In many embodiments, an insulator 510 isolates the wire 506 and coil structure 508 from adjacent wires 506' and/or coils. In some embodiments, the insulator 510 isolates the wire 506 and coil 508 from a support structure 512. In many embodiments, the wire 506 is wrapped about the support structure 512 to form the coil structure 508. In many embodiments, the coil structure 508 defines a volume 514 that defines the core. In some such embodiments, the wire coil short circuit reducer 500 utilizes an "air core" to achieve low permeability. In some embodiments, the environment is an air-filled environment, and the air fills the volume 514 for the "air core."

In many embodiments, the feeder wire 502 can be sized per NEC based for lower ampacities (75° C. or 60° C.), with no issues arising from a mismatch with a higher rating for the wire coil short circuit reducer 500. In many such embodiments, utilizing higher-rated wire 506 and components in the wire coil short circuit reducer 500 enables the fabrication of comparatively smaller wire coil short circuit reducers 500. In numerous such embodiments, the wire coil short circuit reducer 500 can also generate less heat. In many embodiments, the wire coil short circuit reducer 500 can also be made comparatively lighter weight as a result of fewer materials being required. In many such embodiments, utilizing higher rater components in the wire coil short circuit reducer 500 can also make manufacturing the wire coil short circuit reducer 500 comparatively more economical.

In many embodiments, the wire coil short circuit reducer 500 is designed to achieve a specific amount of impedance. In many such embodiments, the amount of impedance is selected to achieve a desired set reduction in the available fault current. In many embodiments, the wire coil short circuit reducer 500 controls inductance by adding wire 504. In many such embodiments, the added wire is added in the form of an increased coil length 508, 508', 508", as depicted in the exemplary embodiments shown in FIG. 5B, illustrating wire coil short circuit reducers 500 with a variety of coil lengths.

In many such embodiments, the inductance amount is selected to reduce phase shift. In many embodiments, the inductance amount is selected to induce a voltage that limits fault current. In some embodiments, the device is configured to control resistance. In many such embodiments, the resistance is selected by adding wire 506. In numerous such embodiments, the wire is added in the form of additional coil length 508. In several embodiments, the resistance amount is selected to reduce the amount of fault current that can flow.

Figure 6:
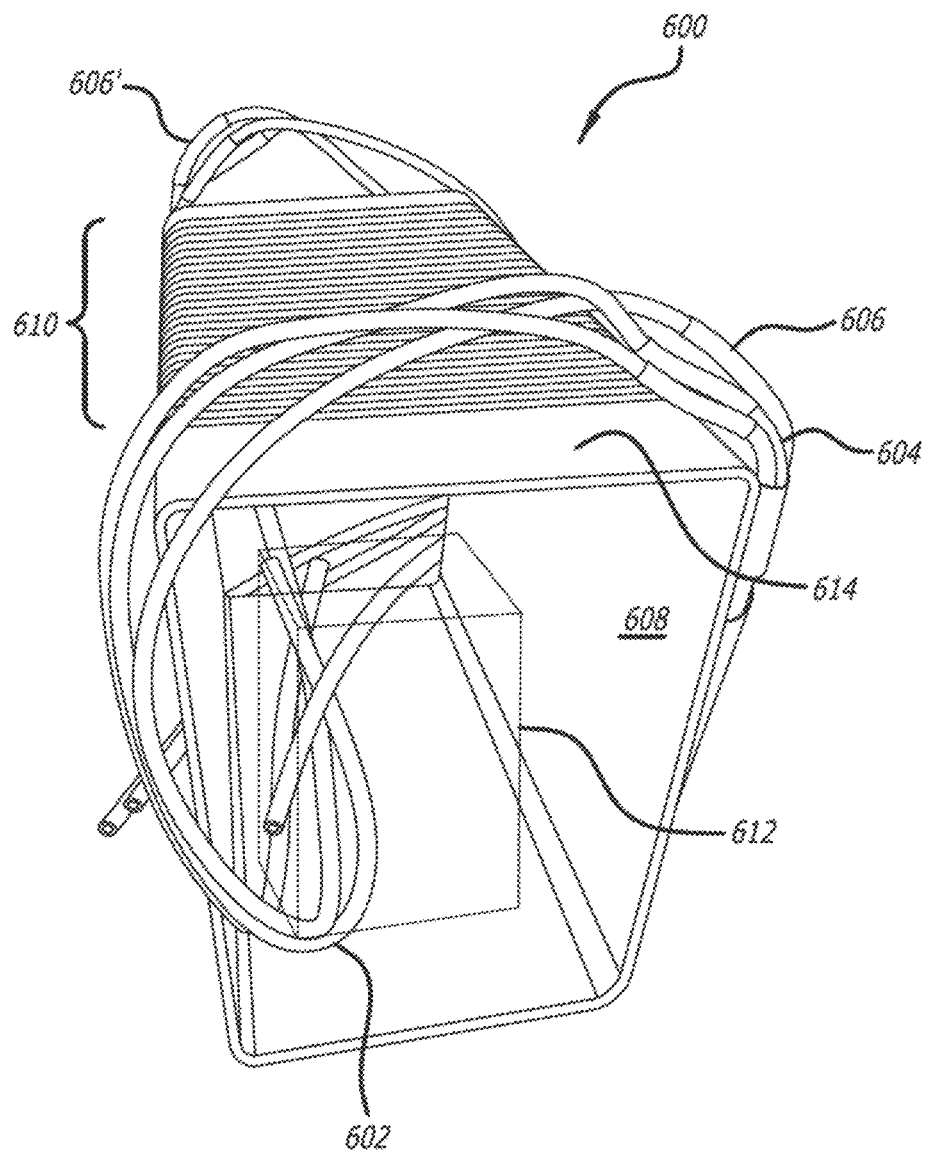
FIG. 6 depicts an exemplary embodiment of a wire coil short circuit reducer with an "air core."

FIG. 6 depicts an exemplary embodiment of a wire coil short circuit reducer 600 with an "air core." A plurality of feeder wires 602 are electrically coupled to coil wires 604 at input and output coupling points 606 and 606'. The plurality of coil wires 604 are wound about a support structure 608, forming a coil structure 610 that defines an inner volume 612. The inner volume 612 is open to the environment, and as such, air fills volume 612, forming an "air core" with low permeability. The plurality of coil wires 604 form a plurality of coil structures 610. The coil wires 604 are insulated from adjacent coil wires with an enamel insulator. The coil structure 610 is also insulated sub-layers and materials such as from the support structure 508, wires 604 and sub-layers of the coil structures 610 with an insulating material 614.

Exemplary Data

In many embodiments, the AFC can be reduced to below 5,000 A. In some embodiment, the AFC is reduced to below the required ratings of electrically coupled equipment. In several embodiments, here, a reduction in AFC is selected to comply with specific requirements and regulations applicable to the installation. In many embodiments, the device is configured for 3-phase electrical circuits. In other embodiments, the device is configured for single-phase electrical circuits. In accordance with numerous embodiments, the device can be utilized with a variety of voltages. For example, some embodiments are configured to be utilized with 208V or 480V.

For example, an embodiment could be configured with coil lengths of 25', 50', and 75' comprised of copper wire and modified polyester basecoat and an improved polyamideimide topcoat (Coil); THHN/THWN (Lead wire) insulators and be configured for a maximum voltage of 600V 3-phase, a maximum AFC of 125,000 A (for 75' model), and a maximum SSCR of 5,000 A. FIGS. 7A through 7C depict additional example data for various embodiments and different applications with varying wire sizes and illustrate the AFC input and AFC output at different wire lengths for 208V and 480V. FIGS. 8A through 8C depict example data and short circuit analysis for embodiments with a variety of sources and a variety of cable lengths, amps, and voltages.

Exemplary Applications

The Wire Coil Short Circuit Reducer is well suited for any electrical circuit where compliance with electrical code requirements isn't met from standard (non-custom) devices and can be used in series with a single device or preceding a multi-circuit panelboard that feeds multiple devices. For example, for use in various electrical applications, including air conditioning and refrigeration equipment, where the SSCR rating of the device is less than the AFC. The Wire Coil Short Circuit Reducer is installed in series with the electrical circuit, ideally close to the connected device. The length of the wire coil and configuration would depend on the specific requirements of the particular application. The appropriate model would be selected according to the application and should be installed in accordance with the necessary code by a qualified installer.

In an exemplary installation in a commercial kitchen (3 phase 300 A 120/208V 3P) lowering the service rating from 65 kAIC to 42 kAIC can save months on equipment lead time and enable the use of more common, more economical, and readily available components lead time.

In an exemplary installation for HVAC equipment (3 phase 300 A 120/208V 3P) reducing the rating can result in significant cost reductions for every HVAC condenser that otherwise would need to be modified to comply with to comply with code.

In another exemplary installation for HVAC equipment, the requirement to raise the rating for equipment could require purchase and installation of a new transformer per UL508 A SB4.3 if the transformer impedance is known, or per tables SB4.3 and SB4.4 if the transformer impedance is not known. The component SCCR and the breaker/fuse interrupting rating on the secondary side of the transformer would need to be equal to or greater than the short-circuit current on the transformer's secondary side, resulting in all of the secondary side devices being raised to the interrupting rating of the breaker/fuse on the transformer which is a significantly more complex and drawn out understating compared to the installation Wire Coil Short Circuit Reducer for the equipment circuits. If the components are 5 kA or greater, then the installation of a transformer would raise all the components to 65 kA as the original 5 kA is greater than 3.23 kA. For a Minimum Circuit Ampacity of 41 A at 230V a 30 kVA transformer would be required.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the terms "approximately" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

What is claimed is:

1. A current reduction device comprising:
    a core, a plurality of terminals, an insulator, and a conductor with a length, a cross-sectional geometry, a first end, and a second end;
    wherein the conductor is disposed about the core forming a conductor structure;
    wherein the core has a permeability;
    wherein each of the plurality of terminals, is electrically conductive, and is electrically coupled to the conductor and the first end and the second end are electrically coupled to separate terminals;
    wherein the insulator is configured to isolate the conductor and is disposed on or about the conductor;
    wherein the length is configured for an impedance selected to reduce a fault current to below a short circuit current; and
    wherein the conductor structure is configured to limit reactance dispersing a magnetic field.

2. The current reduction device of claim 1, wherein at least one of the plurality of terminals is configured as an input terminal configured to receive an electric current from an electrically coupled electrical source, and at least one of the plurality of terminals is configured as an output terminal configured to deliver the electric current to an electrically coupled device.

3. The current reduction device of claim 1, further configured to operate at or below 600V.

4. The current reduction device of claim 1, wherein the insulator comprises a material selected from the group consisting of enamel, epoxy, polymer, ceramic, glass, paper, and composite.

5. The current reduction device of claim 1, wherein the conductor is further configured to operate at or above 90° C.

6. The current reduction device of claim 1, wherein the length is further configured for at least one property selected from the group consisting of: reactance, heating, capacitance, resistance, and inductance.

7. The current reduction device of claim 1, wherein the short circuit current is selected from the group consisting of: 5 kAIC, 10 kAIC, 14 kAIC, 18 kAIC, 22 kAIC, 25 kAIC, 35 kAIC, 42 kAIC, 65 kAIC, 100 kAIC, and 200 kAIC.

8. The current reduction device of claim 2, wherein the short circuit current is below an equipment rating of the electrically coupled device.

9. The current reduction device of claim 1, wherein the conductor structure is configured for an inductance and to reduce phase shift.

10. The current reduction device of claim 2, wherein the electric current received from the electrical source is substantially identical to the electric current delivered to the electrical device.

11. The current reduction device of claim 1, wherein the cross-sectional geometry is configured for a conductor density.

12. The current reduction device of claim 11, wherein the conductor density is configured to limit an inductance.

13. The current reduction device of claim 1, wherein the conductor structure defines a volume defining the core.

14. The current reduction device of claim 1, wherein the core is further configured for a magnetic flux.

15. The current reduction device of claim 14, wherein magnetic flux provides impedance matching.

16. The current reduction device of claim 1, wherein the conductor is wound about the core in a plurality of winding directions configured to limit inductance.

17. The current reduction device of claim 1, wherein the conductor structure is further configured to dissipate heat uniformly.

18. The current reduction device of claim 1, further comprising an enclosure defining an interior volume, and the conductor structure is disposed therein.

19. A system for current reduction, the system comprising:
    an electrical source;
    an electrical device with a short circuit current rating;
    a current reduction device comprising a core, a plurality of terminals, an insulator, and a conductor with a length, across-sectional geometry, a first end, and a second end;
    wherein the conductor is disposed about the core forming a conductor structure configured to limit reactance;
    wherein the length is configured for an impedance selected to reduce a fault current to below a short circuit current;
    wherein the core as a permeability;
    wherein each of the plurality of terminals is electrically conductive, and is electrically coupled to the conductor and the first end and the second end are electrically coupled to separate terminals;
    wherein the insulator is configured to isolate the conductor and is disposed on or about the conductor;
    wherein at least one of the plurality of terminals is configured as an input terminal and electrically coupled to the electrical source, and at least one of the plurality of terminals is configured as an output terminal electrically coupled to the electrical device; and
    wherein when a fault occurs the current reduction device is configured to reduce the fault current to below the short circuit current rating.

20. A current reduction device comprising:
    a core, a plurality of terminals, an insulator, and a plurality of conductors;
    wherein the plurality of conductors are disposed about the core forming a conductor structure;

wherein the core has a permeability;
wherein each of the plurality of conductors is configured with a length, a cross-sectional geometry, a first end, and a second end;
wherein the first end and the second end are electrically coupled to separate terminals;
wherein the cross-sectional geometry is configured for a conductor density;
wherein the insulator is disposed on or about the plurality of conductors and is configured to isolate the plurality of conductors;
wherein the permeability, the length, and the conductor density are configured to limit an inductance;
wherein the length is further configured for an impedance selected to reduce a fault current; and
wherein the current reduction device is configured to reduce the fault current to below a short circuit current.

\* \* \* \* \*